United States Patent [19]

Adamson

[11] 4,222,234
[45] Sep. 16, 1980

[54] DUAL FAN ENGINE FOR VTOL PITCH CONTROL

[75] Inventor: Arthur P. Adamson, Cincinnati, Ohio

[73] Assignee: General Electric Company, Cincinnati, Ohio

[21] Appl. No.: 818,471

[22] Filed: Jul. 25, 1977

[51] Int. Cl.² ............................................. F02K 3/06
[52] U.S. Cl. .................................... 60/226 R; 60/230
[58] Field of Search .................. 60/226 R, 226 B, 224

[56] References Cited

U.S. PATENT DOCUMENTS

| | | | |
|---|---|---|---|
| 2,281,203 | 4/1942 | Pitcairn . | |
| 2,912,188 | 11/1959 | Singelmann . | |
| 3,191,886 | 6/1965 | Lewis et al. | 60/226 R |
| 3,368,352 | 2/1968 | Hewson | 60/224 |
| 3,394,548 | 7/1968 | Grieb | 60/226 R |
| 3,433,244 | 3/1969 | Gardiner et al. | 60/226 R |
| 3,577,736 | 5/1971 | Stevens | 60/226 R |
| 3,761,042 | 9/1973 | Denning | 60/226 R |
| 3,792,584 | 2/1974 | Klees | 60/226 B |
| 3,886,737 | 6/1975 | Grieb | 60/226 R |
| 4,054,030 | 4/1976 | Pedersen | 60/226 B |
| 4,080,785 | 3/1978 | Koff | 60/226 R |

FOREIGN PATENT DOCUMENTS

| | | | |
|---|---|---|---|
| 216838 | 8/1961 | Austria | 60/226 R |
| 2153929 | 10/1971 | Fed. Rep. of Germany | 60/226 R |
| 1007120 | 10/1965 | United Kingdom | 60/226 R |

Primary Examiner—Robert E. Garrett
Attorney, Agent, or Firm—Dana F. Bigelow; Derek P. Lawrence

[57] ABSTRACT

A core engine with a single shaft driving both a forward and a rear fan, with the fans discharging into separate nozzles which are variable to direct exhaust gases in either the downward or rearward direction or in any direction therebetween. Separate flow modulating means are provided with the fans to selectively vary the respective thrusts produced. By selective modulation of the nozzles and the flow-varying means, both engine angle control and position control may be obtained in all three planes. A third variable position nozzle is provided to direct the discharge flow of the core turbine between the downward and rear directions to thereby augment the thrust and control functions.

29 Claims, 7 Drawing Figures

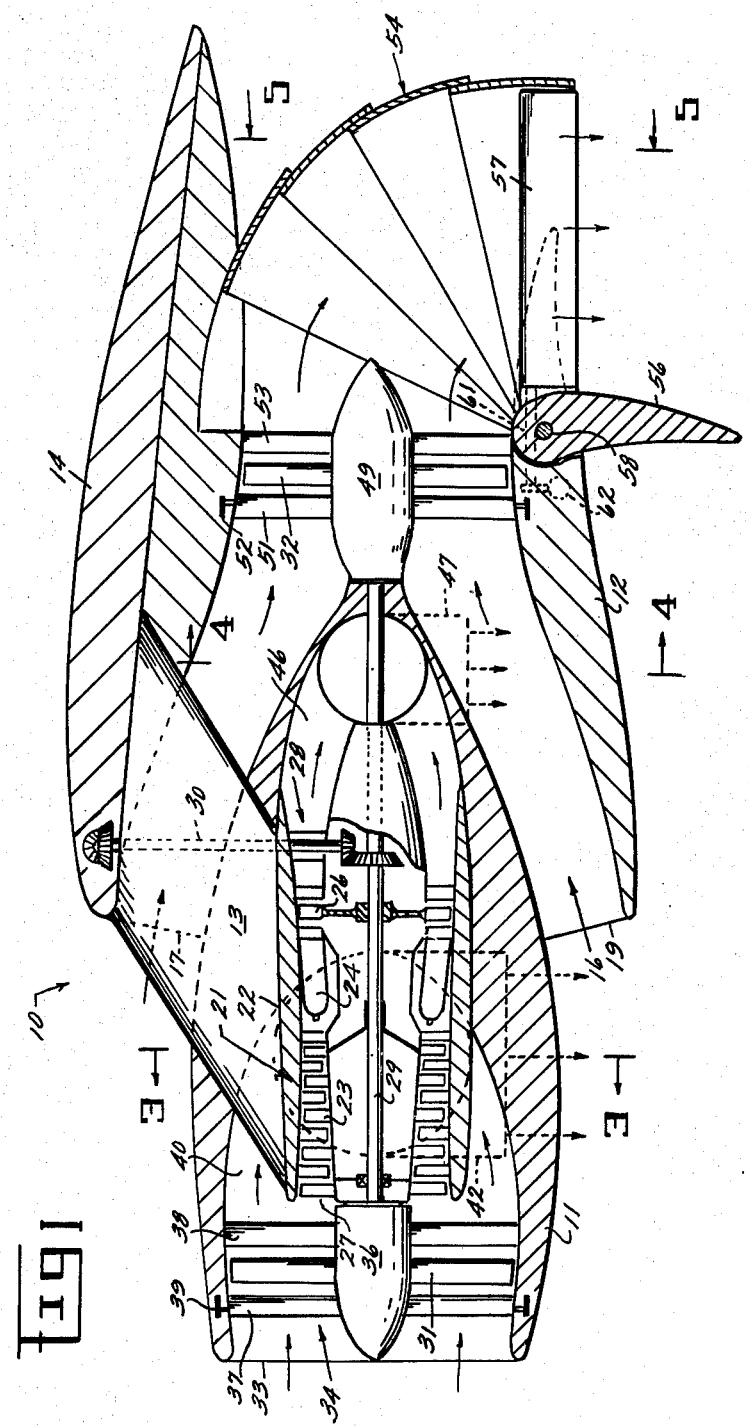

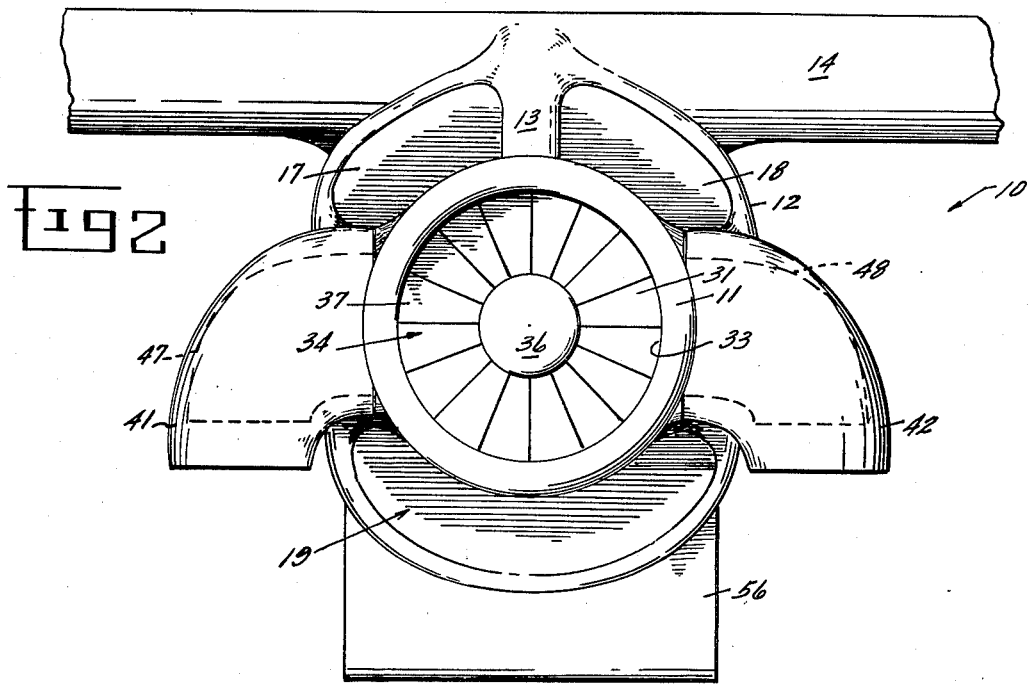
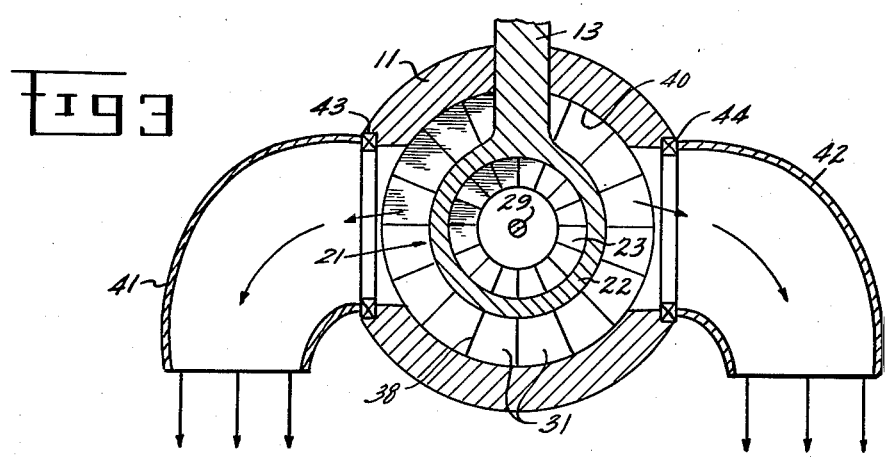
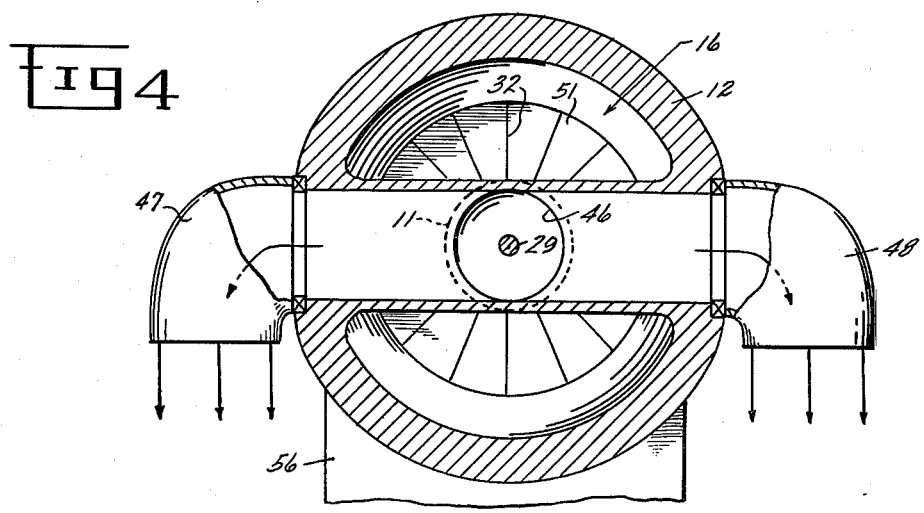

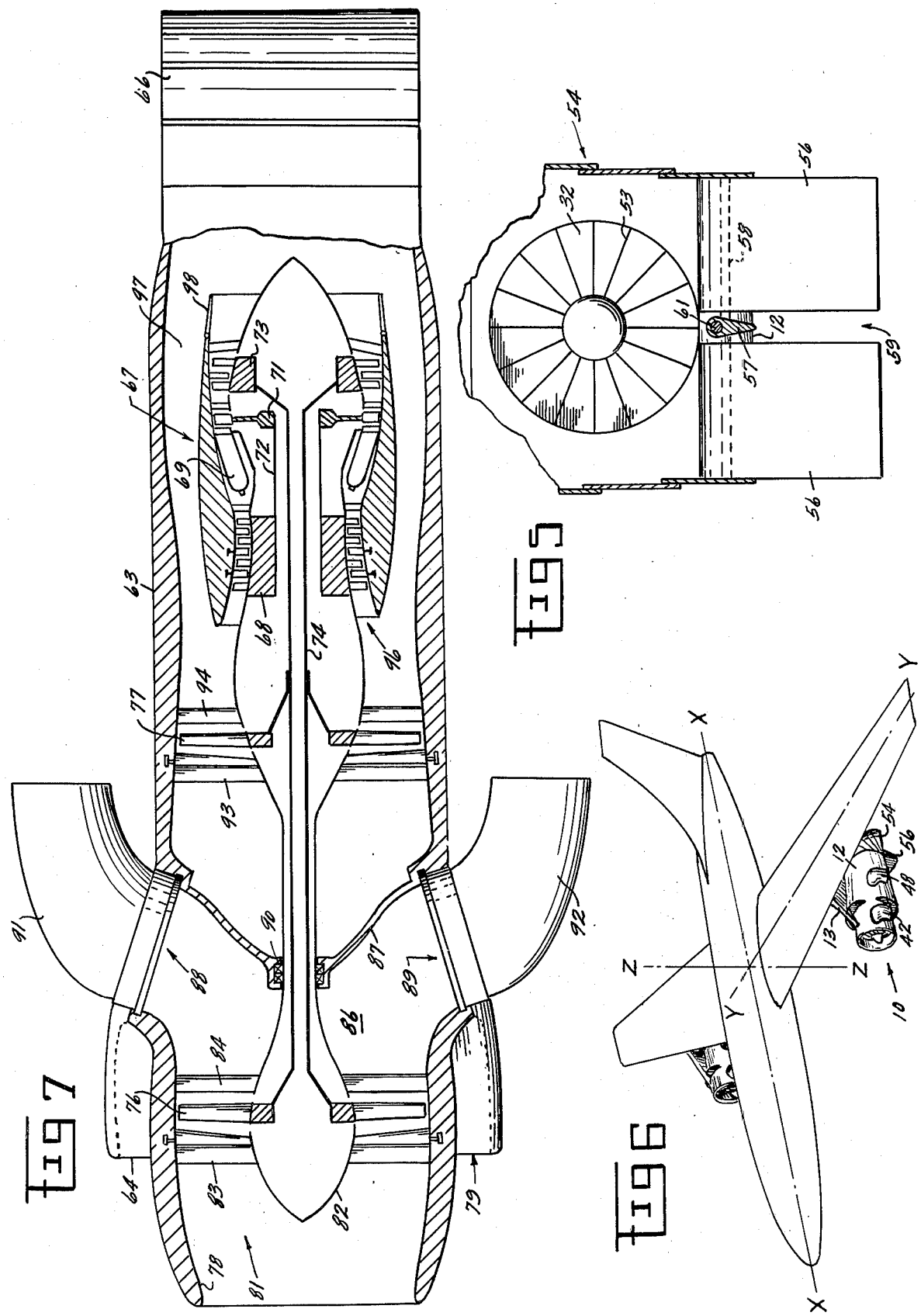

DUAL FAN ENGINE FOR VTOL PITCH CONTROL

BACKGROUND OF THE INVENTION

This invention relates generally to gas turbine engines and, more particularly, to thrust control features of an aircraft engine of the VTOL type.

For many years the so-called "fixed-wing" aircraft, wherein horizontal flight was efficiently obtained but the vertical movement in takeoff and landing was obtained only by the use of long runways and/or catapults, was the only type available. With the advent of the helicopter, the vertical takeoff and landing eliminated those difficult problems but the aircraft was then inefficient in horizontal flight. The so-called VTOL (vertical takeoff and landing) embodies a concept which incorporates the advantages of both the fixed-wing aircraft and helicopter to enable both vertical takeoff and landing and efficient horizontal flight.

The flexibility of the VTOL aircraft is generally obtained by the use of gas turbine engines to develop thrust which is, in turn, directed to either the vertically down or horizontally rearward directions. One approach is to use separate engines for lift and cruise, but of course the inefficiencies are substantial. Another approach is to use a plurality of gas turbine engines which are adaptable to varying their thrust forces from the vertical to the horizontal direction by way of appropriate thrust deflecting means. In order to maintain stability of the aircraft this approach necessarily requires at least three gas turbine engines, one in each wing and one in the nose of the aircraft.

The most common approach to VTOL aircraft is the use of a pair of gas turbine engines which drive a plurality of remote lift/cruise fans which are operated in the lift mode only during takeoff and landing and in the cruise mode only during horizontal flight. Drive connection between the gas turbine engines and the fans is made by either drive shafts or by tip turbine apparatus. Again, with this approach, it is recognized that at least three such lift/cruise fans are required in order to maintain the aircraft in a stable position. The fans are generally located one in each wing and one in the nose section of the aircraft. The engines located on the wings may be adaptable to direct the thrust either in the downward or the rearward direction to accommodate the respective lift and cruise conditions of operation. But the remote fan located in the nose section of the aircraft is used only for lift, with the forward position thereof accommodating pitch control of the aircraft by appropriate modulation of thrust. In other words, in order to provide pitch control for the aircraft it is necessary to have at least a pair of axially spaced engines, or remote fans with the relative thrust being adjustable in order to maintain the desired attitude of the aircraft. Since the forward or nose engine/remote fan can only be used for lift purposes, such an arrangement becomes inefficient during cruise operation.

Another problem associated with present VTOL engines is the fact that the large fans required for the increased thrust levels are necessarily tip speed limited and, thus, the shaft speeds are accordingly limited. This, in turn, makes it difficult to obtain an efficient match-up between the fan and turbine designs.

It is therefore an object of the present invention to provide a single engine which can be used to produce thrust for both lift and cruise conditions of a VTOL aircraft.

Another object of the present invention is the provision in a VTOL aircraft for eliminating the use of fans which can be used for lift purposes only.

Yet another object of the present invention is the provision in a VTOL aircraft for the elimination of a remote fan in the nose section of the aircraft.

Still another object of the present invention is the provision in a VTOL aircraft for providing pitch control with the use of a single engine.

Still another object of the present invention is the provision in a VTOL aircraft for an engine which is relatively light in weight and which operates to provide thrust in both the lift and cruise conditions of operation.

Still another object is the efficient coupling of a high RPM, lightweight turbine to a high airflow, high shaft speed fan device.

These objects and other features and advantages become more readily apparent upon reference to the following description when taken in conjunction with the appended drawings.

SUMMARY OF THE INVENTION

Briefly, in accordance with one aspect of the invention, a gas turbine core is used to drive a single shaft which, in turn, drives a pair of axially spaced fans having independent flow streams whose discharges can be directed in any direction between the downward and rearward directions. Each of the fans also has a means of varying the volume of flow so as to modulate the thrust thereof. By proper modulation of the thrust vectoring devices and of the flow modulation devices, the direction of the thrust on the aircraft can be varied to provide either upward or forward thrust and, further, the attitude or pitch of the aircraft can also be selectively varied.

By another aspect of the invention, the discharge of one of the fans may be directed so that its force vector is offset from the axis of the engine to thereby provide roll and yaw control of the aircraft. Preferably, the discharge is directed transversely out either side of the engine to an elbow which can be rotated anywhere from the downward to the rearward direction.

By yet another aspect of the invention, the core engine is located between the two fans. The forward engine provides a portion of its air to the core engine and the bulk of its air to the forward flow deflecting apparatus. The rear fan receives its intake from a converging duct and discharges its air to a nozzle adapted to direct the flow either in the rearward or downward direction.

By still another object of the invention, the core discharge air flows to yet another thrust vectoring means which acts to direct the thrust in the appropriate direction for either lift or cruise conditions. Preferably, the core thrust vectoring means comprises a pair of rotatable elbows on either side of the engine which receives the transverse flow of hot core gases and directs them in the appropriate direction to augment the thrust and angle control efforts of the engine.

In the drawings as hereinafter described, a preferred embodiment and modified embodiments are depicted; however, various other modifications and alternate constructions can be made thereto without departing from the true spirit and scope of the invention.

BRIEF DESCRIPTION OF THE DRAWINGS

FIG. 1 is a schematic illustration of a gas turbine engine in accordance with the preferred embodiment of the invention;

FIG. 2 is a partial frontal view thereof;

FIG. 3 is a sectional view thereof as seen along line 3—3 of FIG. 1;

FIG. 4 is a sectional view thereof as seen along line 4—4 of FIG. 1;

FIG. 5 is a sectional view thereof as seen along line 5—5 of FIG. 1;

FIG. 6 is a schematic illustration showing the various axes related to aircraft control; and FIG. 7 is a schematic illustration of a modified embodiment of the present invention.

DESCRIPTION OF THE PREFERRED EMBODIMENT

Referring now to FIGS. 1 and 2, a turbofan engine is shown generally at 10 as comprising an inner nacelle 11 and an outer nacelle 12, spaced radially outward and axially rearward from the inner nacelle 11 and rigidly affixed thereto by a strut 13. The outer nacelle 12 is attached to the underside of an aircraft wing 14 so as to support the engine in a manner well known in the art.

Formed by the converging inner side of the outer nacelle 12 and the outer periphery of the inner nacelle 11 is an annular rear fan duct 16 having inlet openings 17 and 18 at the top section thereof and inlet opening 19 at the lower portion thereof. These inlets are exposed to the ambient air during flight conditions and act to provide a working fluid to the rear fan as will be described hereinafter.

The inner nacelle 11 is a tear-shaped, substantially hollow structure having a core engine 21 disposed therein. The core engine 21 comprises a substantially cylindrical needle 22 encasing in serial flow relationship a compressor 23, a combustor 24 and a turbine 26. The core engine 21 operates in a conventional manner with cold air flowing in the intake 27 and hot exhaust gases flowing out the exhaust end 28 as shown by the arrows. The drive shaft 29 drivingly connects the compressor 23 and turbine 26 sections of the core engine and extends both forwardly and rearwardly to drivingly connect the forward 31 and rear 32 fans, respectively.

At the forward end of the inner nacelle 11 is an air intake opening 33 and a front fan duct 34 mutually defined by the inner nacelle 11 and the bullet nose 36. Inlet guide vanes 37 are provided forward of the fan 31 and outlet guide vanes 38 are provided rearwardly thereof. Modulation means 39 is provided with the inlet guide vanes so as to enable the variation in angle thereof which, in turn, causes a variation of fluid flow in the duct 34.

As can be seen, the front fan 31 acts as a precompressor, with the radially inner portion of the discharge air flowing into the core inlet 27. The remaining portion flows into a semielliptical cavity 40 which fluidly communicates with a pair of opposed rotatable elbow nozzles 41 and 42, located on either side thereof.

Referring now to FIG. 3, the nozzles 41 and 42 are rotatably mounted on the inner nacelle 11 by way of bearings 43 and 44, respectively, to provide selective directional discharge of the air from the cavity 40 as shown by the arrows. It will be recognized that the nozzles 41 and 42, when positioned as shown, will direct the air downward to produce an upward the thrust for lift. Rotation of both the nozzles to a position 90° to the rear, will direct the exhaust rearwardly and provide forward thrust for cruise. Any intermediate position will provide a combination of upward and forward thrust at either one or both of the nozzles.

It will, of course, be recognized that with a pair of engines located one on either side of the fuselage, roll of the aircraft can be controlled by selectively modulating the flow of the respective engines. For example, if it is desirable to roll downwardly to the right during a vertical takeoff maneuver, the flow volume in the right engine could be reduced or that in the left engine could be increased to thereby provide a resultant clockwise movement about the fuselage and a rolling of the aircraft.

Referring again to FIG. 1, it will be seen that the inner nacelle forms a parabolic-shaped cavity 46 into which the core engine exhaust 28 discharges. In a manner similar to that of the cavity 40, the cavity 46 is fluidly connected to a pair of rotatable elbow nozzles 47 and 48 on either side thereof (see FIG. 4). These nozzles are rotatable in the same manner as the nozzles 41 and 42 to provide thrust in the upward or rearward directions or in any direction therebetween. Again, for multi-engine aircraft, selective modulation of the flow volumes will provide for roll control of the aircraft.

As mentioned hereinbefore, the drive shaft 29 extends rearwardly to drivingly connect to the rear fan 32. To accomplish this, the drive shaft 29 passes through the rear portion of the inner nacelle 11 and terminates in an aerodynamic plug 49 which defines the inner flow path of the rear fan duct at the rear fan location. Inlet guide vanes 51 are provided with variable means 52 for modulating the angle thereof and thus the amount of flow in the duct 16. Outlet guide vanes 53 are provided downstream of the rear fan 32 and may also be variable if desired.

A crossover shaft 30 with appropriate associated gearing may be provided to transmit power to or from the turbine shaft 29 in the event of an engine failure or shut down.

Downstream of the outlet guide vanes 53, the outer nacelle 12 diverges to form the periphery exhaust nozzle for the rear fan 32. A vectoring nozzle 54 of the lobster tail-type is included to provide directional control of the fan thrust. A secondary nozzle 56 is provided at the underside of the nacelle 12 to operate in cooperation with the lobster tail nozzle 54 for that purpose. When it is desired to obtain downward thrust, as for lift off, the lobster tail nozzle 54 is extended as shown and the secondary nozzle 56 is directed downwardly to direct the gases as shown by the arrows in FIG. 1. When rearward thrust is desired, as for a cruise, the lobster tail nozzle is retracted into the upper portion of the nacelle 12 and the secondary nozzle 56 is extended rearwardly as shown by the dotted lines to direct the gases in the rearward direction.

Referring to FIGS. 1 and 5, the secondary nozzle 56 and a horizontal vane 57 are shown in the downwardly directing positions. The secondary nozzle 56 which is rotatably mounted on the transverse shaft 58 is bifurcated to form a central slot 59 for receiving the vane 57 therein. The vane 57, in turn, is mounted on a fore and aft axis 61 and is cantilevered rearwardly to the extent of the lobster tail nozzle 54. A rotating means 62 such as a gear or the like, is provided to rotate the shaft 61 so as to align the vane 57 as desired. Use of the vane in this way allows the diverting of exhaust gases to either side of the engine so as to thereby provide sideways thrust thereto.

Operation of the above-described engine is as follows. For vertical takeoff, all three sets of nozzles, those for the forward fan 31, those for the core 21 and those for the rear fan 32 are removed to direct the exhaust gases straight downwardly. Since the front and rear fans 31 and 32, respectively, are driven by the same shaft and are therefore rotating at the same speed, the relative amounts of discharge flow will be proportional regardless of the speed of the engine. Thus, in order to control the pitch of the engine, it is necessary to vary the respective flows by way of the variable inlet guide vanes 37 and 52 so that the respective thrusts cooperatively act to maintain the engine in the proper attitude.

After the engine has completed take-off, the nozzles are then actuated to direct the exhausts rearwardly as described hereinabove. The exhaust from the front fan 31 is then discharged in the rearward direction from elbow nozzles 41 and 42, the gas turbine discharge air is directed rearwardly by the elbow nozzles 47 and 48, and the rear fan exhaust flow is directed rearwardly by way of the outer nacelle 12. When it is desired to land the aircraft, the nozzles again are moved to the initial position to direct the exhaust gases downwardly. For maneuvers other than direct vertical lift and horizontal cruise, the nozzles are modulated to intermediate positions as appropriate.

It will be recognized that with the above-described variable thrust means, it is possible to maintain aircraft angle control as well as aircraft position control with a single engine. For example, pitch control can be maintained by proper modulation of either or both the direction and volume of discharge flow from the respective front and rear fans, 31 and 32, respectively. Yaw of the aircraft can be controlled by properly rotating the elbows on opposite sides of the engine, i.e., by an increase or decrease of the horizontal component of thrust on either side of the engine.

In addition to the aircraft angle control as described hereinabove, the inventive engine also acts to provide aircraft position control. Referring to FIG. 6, wherein a pair of engines are mounted under the wing, one on either side of the fuselage, the aircraft's position can be moved on the coordinates shown by proper modulation of the nozzles. Assuming that the engine is in a takeoff mode of operation with the exhaust gases from each of the nozzles being directed downwardly, the aircraft can be positioned on the X axis by rotating the elbow nozzles in unison to direct the exhaust gases so as to provide a forward or rearward component of thrust. To move the aircraft sideways on the Y axis, the vane 57 can be rotated so as to provide a discharge of gases in the desired sideward direction. At the same time a coordinated compensating amount of yaw control as described hereinabove would be introduced to compensate for the resulting yaw from use of the vane. To control the position on the Z axis, the engine throttle or the inlet guide vanes can be modulated to vary the amount of engine thrust.

Referring now to FIG. 7, a modified embodiment of the present invention is shown having a nacelle 63 with a converging air inlet 64 and a variable nozzle 66 of the ADEN (augmented deflection exhaust nozzle) type as shown and described in U.S. Pat. No. 4,000,612, issued on Jan. 4, 1977, and assigned to the assignee of the present invention. The core engine 67 has a compressor 68, preferably with variable area nozzles, a combustor 69 and a high pressure turbine 71 for driving the compressor by way of shaft 72. Immediately downstream of the high turbine 71 is a low pressure turbine 73 which provides motive power to the low pressure turbine shaft 74. The low pressure shaft 74 extends forwardly to drive both a forward and rear fan, 76 and 77, respectively.

Circumscribing the forward fan 76 is an inner shroud 78 which defines the inner flow path of the rear fan duct 79 and the outer flow path of the front fan duct 81. The inner flow path of the front fan duct 81 is provided by an aerodynamic bullet nose 82. Extending radially across the front fan duct are variable inlet guide vanes 83 and outlet guide vanes 84. Formed rearwardly of the outlet guide vanes 84 is a front fan plenum 86 partially defined by the inner nacelle 78, by the bullet nose 82 and by the rear manifold 87 through which the low pressure shaft 74 extends by way of appropriate bearings 90. The plenum 86 communicates with a pair of ports 88 and 89 extending through the nacelle 63 to elbow nozzles 91 and 92, respectively, which are rotatable within their respective ports by way of appropriate bearing means.

The rear fan duct 79 converges downstream past the plenum 86 to the variable inlet guide vanes 93, rear fan 77 and outlet guide vanes 94. The flow path then splits to a core duct 96 and a core bypass duct 97.

In operation, ambient air enters the rear fan duct 79, is compressed by the rear fan 77 and a portion of the air flows along the bypass duct 97 for subsequent mixing and exhausting out the nozzle 66. Another portion of the compressed air passes through the core engine 67 where it is further compressed and burned to provide motive power to the high pressure and low pressure turbines 71 and 73, respectively. The hot turbine discharge gases are then mixed with the cooler bypass air and discharged out the nozzle 66. A secondary nozzle 98 may be included at the turbine exhaust point to act as a mixer between the hot and cold gas streams. The discharge flow from the nozzle 66 may be directed rearwardly for cruise conditions or downwardly for lift conditions or anywhere in between as contemplated by the operator.

The forward fan 76 which is also driven by the flow pressure turbine 73 receives air from the front fan duct 81 and compresses it before it enters the plenum 86 and the two nozzles 91 and 92. Selective rotation of the nozzles 91 provides thrust in any direction between the upward and forward directions. By proper modulation of the nozzles 91, 92 and 66, both angle control and position control of the engine and the associated aircraft can be maintained.

It will be understood that while the present invention has been described in terms of preferred and modified embodiments, it may take on any number of other forms while remaining within the scope and intent of the invention. For example, the flow varying means associated with the fans may comprise variable pitch fan apparatus rather than variable inlet guide vanes.

Having thus described what is claimed and considered novel and desired to be secured by Letters Patent of the United States is:

1. An improved turbofan engine of the type having in serial flow relationship a first fan having intake and exhaust nozzle means, a compressor, a combustor and a turbine drivingly connected to the first fan by a drive shaft wherein the improvement comprises:

a second fan spaced axially from the first fan and having air intake and exhaust nozzle means independent from those of the first fan said second fan being spaced axially downstream from and drivingly connected to the turbine by the drive shaft and said second fan exhaust nozzle means being substantially axially spaced from that of said first fan.

2. An improved turbofan engine as set forth in claim 1 and including means for selectively varying the amount of thrust produced by said first and second fans.

3. An improved turbofan engine as set forth in claim 1 and including a thrust vectoring means for at least one of said fans.

4. An improved turbofan engine as set forth in claim 1 and including thrust vectoring means for each of said first and second fans.

5. An improved turbofan engine as set forth in claim 3 wherein said thrust vectoring means comprises a pair of diametrically opposed rotatable elbows.

6. An improved turbofan engine as set forth in claim 4 wherein the thrust vectoring means for one of the fans comprises a lobster tail-type vectoring nozzle.

7. An improved turbofan engine as set forth in claim 1 and including a turbine discharge duct which axially terminates at a fixed wall downstream from said turbine.

8. An improved turbofan engine as set forth in claim 7 wherein said turbine discharge duct communicates with a thrust vectoring nozzle.

9. An improved turbofan engine as set forth in claim 8 wherein said thrust vectoring means comprises a pair of diametrically opposed rotatable elbows.

10. An improved turbofan engine as set forth in claim 1 and including a fan discharge plenum which is defined in part by a fixed wall downstream from said fan.

11. An improved turbofan engine as set forth in claim 10 wherein said fan discharge plenum communicates with a thrust vectoring means.

12. An improved turbofan engine as set forth in claim 11 wherein said thrust vectoring means comprises a pair of diametrically opposed rotatable elbows.

13. An improved turbofan engine as set forth in claim 1 and including a converging bypass duct for introducing air to said second fan.

14. An improved turbofan engine as set forth in claim 1 wherein said flow varying means comprises a variable inlet guide vane.

15. An improved turbofan engine of the type having in serial flow relationship a first fan and a core drivingly connected to the fan by way of an axial shaft wherein the improvement comprises: a second fan axially spaced from said first fan and drivingly connected to the axial shaft at a position axially downstream from said core, said first and second fan each having its own flow path with no fluid communication therebetween.

16. An improved turbofan engine as set forth in claim 15 and including means for selectively varying the flow volumes through said respective first and second fans.

17. An improved turbofan engine as set forth in claim 15 and including nozzle means located downstream of at least one of said fans to direct the discharge air therefrom in a desired direction.

18. An improved turbofan engine as set forth in claim 17 wherein said nozzle means comprises a pair of diametrically opposed rotatable elbows.

19. An improved turbofan engine as set forth in claim 15 wherein one of said fans has associated therewith a discharge plenum partially defined by a fixed wall downstream from said fan.

20. An improved turbofan engine as set forth in claim 19 wherein said plenum fluidly communicates with thrust vectoring means.

21. An improved turbofan engine as set forth in claim 20 wherein said thrust vectoring means comprises a pair of diametrically opposed rotatable elbows.

22. An improved turbofan engine as set forth in claim 16 wherein said flow varying means for at least one of said fans comprises variable inlet guide vanes.

23. An improved turbofan engine of the type having a pair of axially spaced turbine driven fans for independently receiving and discharging airflow wherein the improvement comprises:
(a) first means for receiving and directing at least a portion of the discharge flow from the first of the pair of axially spaced driven fans
(b) second means for receiving and directing discharge flow from the second of the pair of axially spaced driven fans, said first and second receiving and directing means each being independently movable between a first position wherein the discharge flow is directed in the vertical direction and a second position wherein the discharge flow is directed in a horizontal direction, and
(c) wherein one of said turbine driven fans is located aft of its driving turbine.

24. An improved aircraft engine as set forth in claim 23 wherein one of said fans is located forward of its driving turbine.

25. An improved turbofan engine as set forth in claim 24 and including a compressor between said fan and turbine for receiving a portion of discharge flow from said fan.

26. An improved aircraft engine as set forth in claim 23 wherein said pair of axially spaced fans are connected to and driven by a common shaft.

27. An improved aircraft engine as set forth in claim 23 and including flow modulating means for both of said pair of axially spaced fans.

28. An improved turbofan as set forth in claim 27 wherein said flow modulating means comprises variable inlet guide vanes.

29. An improved aircraft engine as set forth in claim 23 wherein at least one of said first and second receiving and directing means comprises a pair of diametrically opposed rotatable elbows.

* * * * *